Dec. 25, 1951     R. NICHOLS ET AL     2,580,187
NUT-TAPPING MACHINE Filed May 14, 1948     8 Sheets-Sheet 1

Fig.1

Inventors
R. Nichols
W. Brown
By Glascock Downing Seebell
Attys

Dec. 25, 1951   R. NICHOLS ET AL   2,580,187
NUT-TAPPING MACHINE

Filed May 14, 1948   8 Sheets-Sheet 4

Fig.4

Inventors
R. Nichols
W. Brown
By Hancock Downing Reebold
Attys.

Dec. 25, 1951 R. NICHOLS ET AL 2,580,187
NUT-TAPPING MACHINE
Filed May 14, 1948 8 Sheets-Sheet 5

Fig.7

Dec. 25, 1951  R. NICHOLS ET AL  2,580,187
NUT-TAPPING MACHINE

Filed May 14, 1948  8 Sheets-Sheet 8

Inventors
R. Nichols
N. Brown

Patented Dec. 25, 1951

2,580,187

UNITED STATES PATENT OFFICE 2,580,187

NUT-TAPPING MACHINE

Rex Nichols, Edgbaston, Birmingham, and William Brown, Kings Heath, Birmingham, England Application May 14, 1948, Serial No. 27,056
In Great Britain June 16, 1947

4 Claims. (Cl. 10—139)

This invention relates to nut-tapping machines of the kind in which work pieces are fed in succession to a rotary and axially movable tap, or each of a plurality of such taps, and are held against rotation while the tap is passing through them, the arrangement being such that the tapped work pieces accumulate on the tap until discharged from the end remote from the operative end.

The primary object of the invention is to provide improved means for automatically feeding the work pieces to the position or positions in which they can be tapped.

Another object of the invention is to render the machine fully automatic in its action.

In the accompanying sheets of explanatory drawings.

The machine shown in Figures 1 to 7 of the drawings is provided with a pair of vertically arranged rotary and axially movable tap spindles as 1 adapted to be rotated by an electric motor 2 through the medium of a belt 3 passing around pulleys as 4 on the motor spindle and near the upper ends of the tap spindles, the latter being in slidable spline connection with the corresponding pulleys. To the lower ends of the tap spindles 1 are secured tap-holders each comprising a hollow body part 5 having a side opening 6, and a tubular guide 7 depending from the underside of the body part, the guide and body part being adapted to accommodate the stem of a tap 8 provided with a curved upper end, and to permit tapped work pieces (through which the operative end of the tap has passed) to accumulate on the stem until they reach its upper curved end, whereupon they are flung by centrifugal force off the stem and through the side opening of the body part into a surrounding casing 9 from which they are delivered by a chute 10. Such a tap holder and tap are known and do not require further description. The tap spindles 1 are rotatably supported by ball bearings 11 in sleeves 12 which, together with the tap spindles, are vertically slidable in bearings 13 carried by or formed integrally with a plate or bracket 14, the latter being supported on a fixed part of the machine by vertical guides 15, and being vertically adjustable by a rotatable but axially immovable stem 16 in screw thread engagement with a complementary part 17 of the plate or bracket.

In carrying the invention into effect in the manner shown in the drawings, we employ for imparting axial movements to the vertically arranged tap spindles 1, a piston 18 which is slidable in a fixed vertical cylinder 19 mounted on a horizontal web 20 uniting the bearings 13 in which the spindle-supporting sleeves 12 are slidable. The piston 18 is provided with a rod 21 which extends through the lower end of the cylinder 19 and through the web 20, and which at its lower end carries an adjustable collar 22. This collar serves at its upper side to support the adjacent ends of a pair of lateral projections 23 respectively formed on annular members 24 which are secured to the lower ends of the sleeves 12, and which carry and close the upper ends of the casings 9 surrounding the tap holders above described. The adjacent ends of the lateral projections 23 are also shaped to rest one on the other. Thus, the outer end of the right hand projection 23 in Figure 4 rests on the adjacent end of the left hand projection 23. The purpose of this is to prevent downward movement of the tap spindle 1 associated with the right hand projection 23 when downward movement of the other tap spindle is obstructed. The cylinder 19 is provided at its upper and lower ends with pipe connections 25 through which compressed air can be admitted to and released from the cylinder. Upward movement of the piston 18 under the action of compressed air admitted to the lower end of the cylinder 19 is accompanied by corresponding upward movement of the sleeves 12 carrying the tap spindles 1, due to the interaction of the collar 22 on the piston rod 21 and the lateral projections 23 on the annular members 24 secured to the sleeves. Downward movement of the piston 18 under the action of compressed air admitted to the upper end of the cylinder allows the sleeves 12 carrying the tap spindles 1 to descend under the action of gravity. During the downward movements of the tap spindles 1, the taps 8 act on the work pieces to be tapped, and as these movements are effected under the action of gravity alone, any obstruction thereto as a result of an inaccuracy in a work piece occupying a tapping position will merely cause the descending tap to be arrested without breaking or otherwise damaging the tap.

Figure 1:
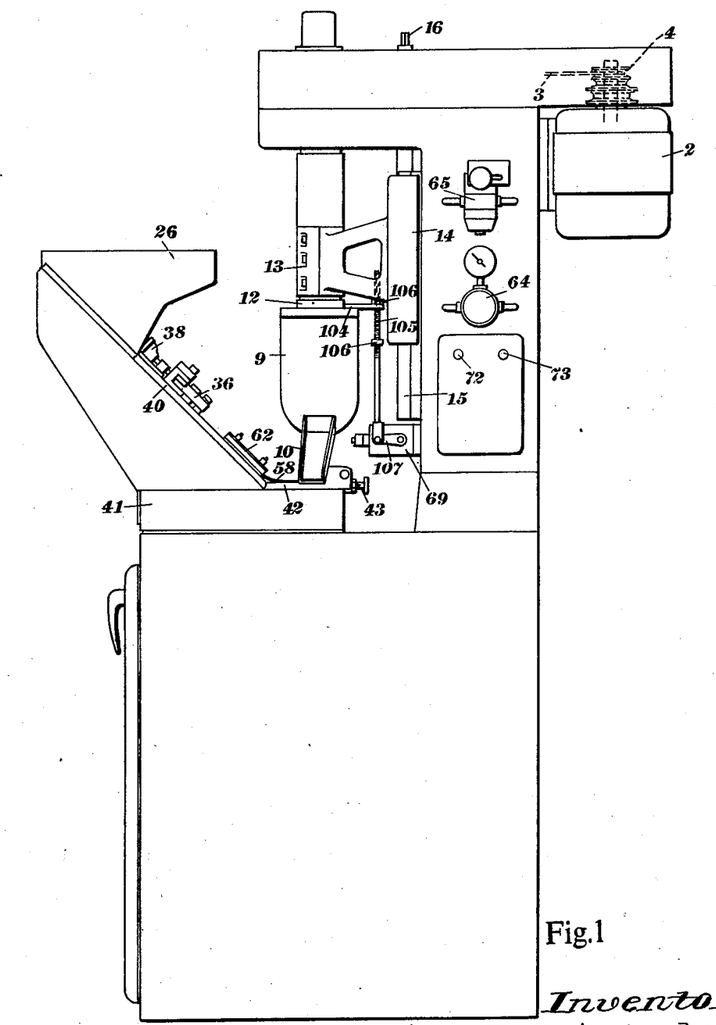
Figures 1 and 2 are respectively a side view and a front view of a two-spindle automatic nut-tapping machine embodying the invention.
Figure 2:
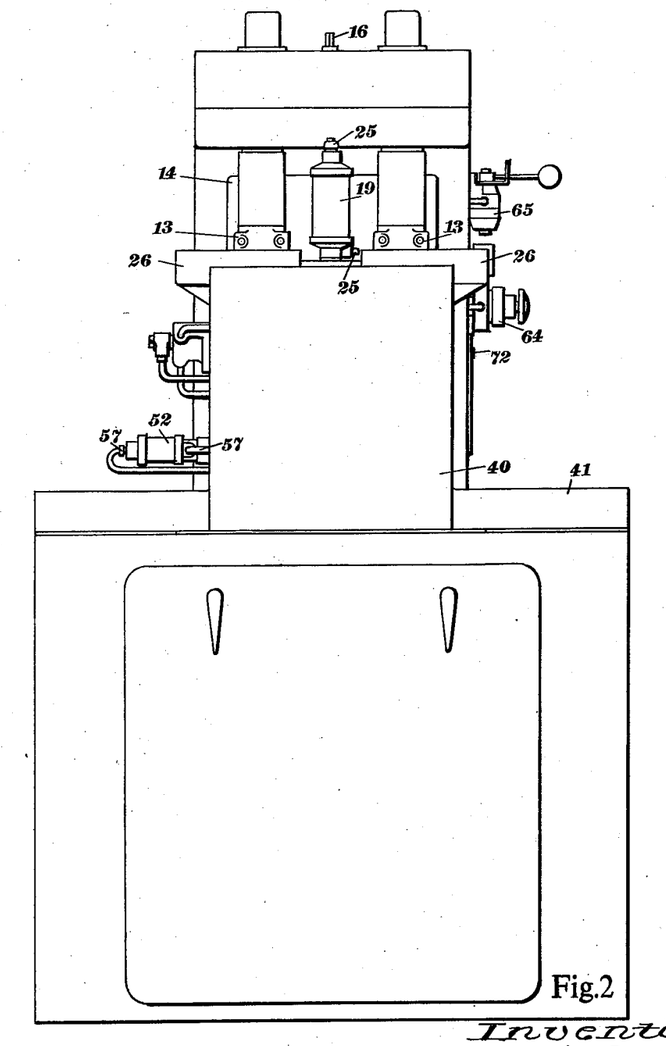
Figure 3:
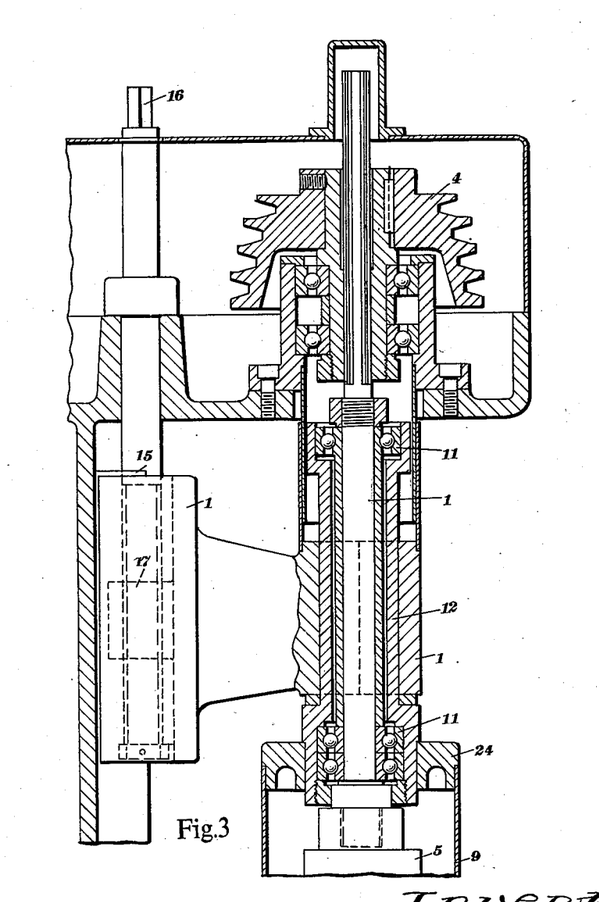
Figures 3 and 4 are respectively a sectional side view and a front view of the tap spindles and their actuating means drawn to a larger scale than Figures 1 and 2, Figure 3 being taken on the line 3—3 of Figure 4.
Figure 4:
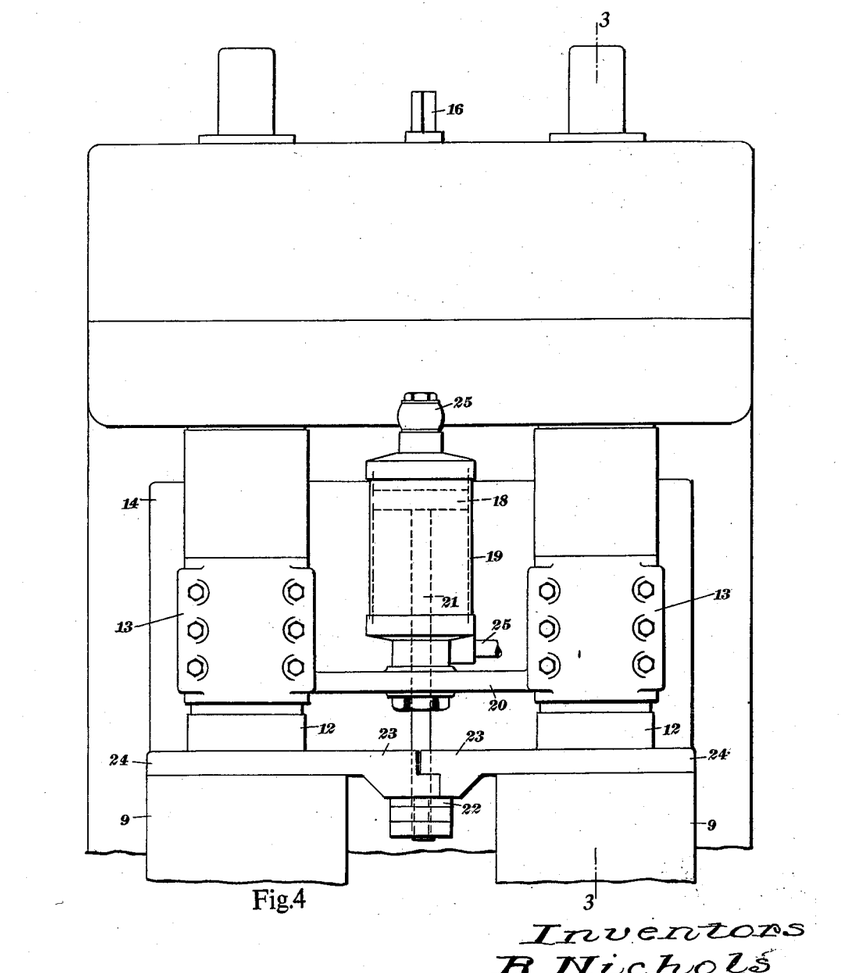
Figures 5, 6:
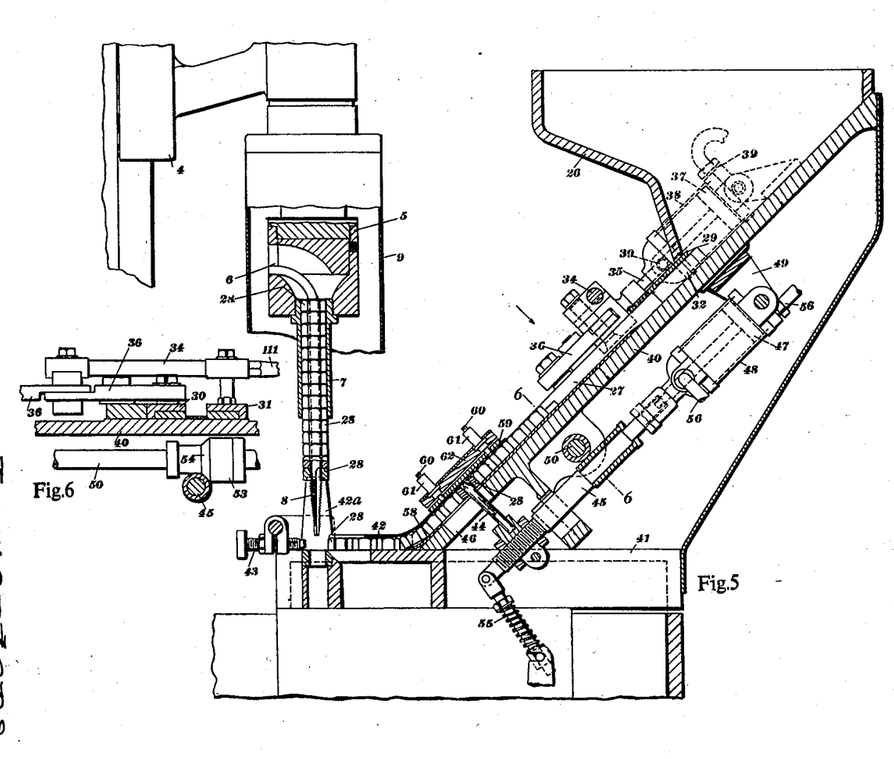
Figure 5 is a sectional side view of the work-piece feeding means drawn to the same scale as Figures 3 and 4 and taken on the line 5—5 of Figure 7.
Figure 6 is a fragmentary sectional view taken on the line 6—6 of Figure 5.
Figure 7:
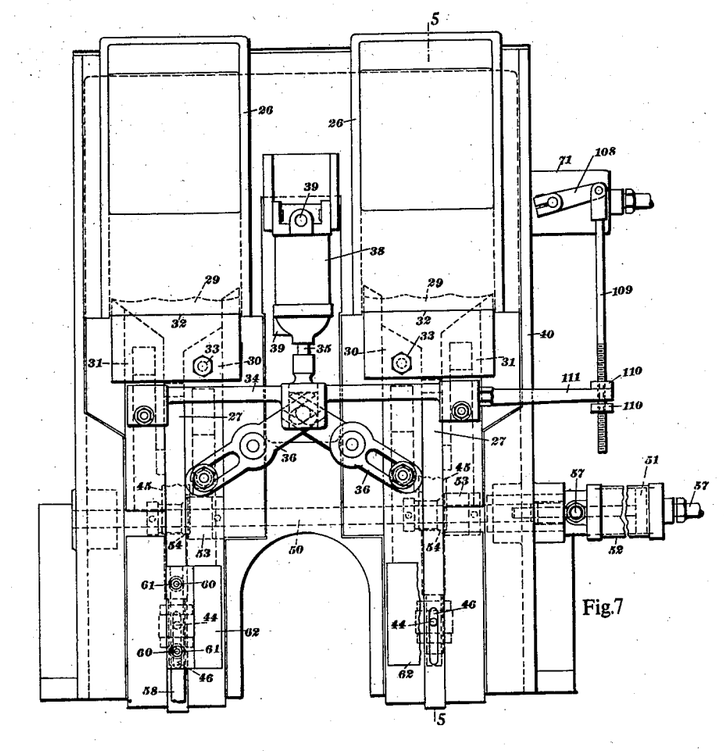
Figure 7 is a plan view of the work-piece feeding means looking in the direction of the arrow shown in Figure 5.

For receiving the work pieces to be tapped, we employ a pair of hoppers 26, and in communication with the lower ends of these hoppers we arrange a pair of inclined chutes 27 along which the work pieces can travel in succession under the action of gravity. In Figure 5 a number of the work pieces are shown and indicated by 28. The width of the chutes 27 may conveniently be made adjustable to suit work pieces of different sizes. To facilitate delivery of the work pieces from the hoppers 26 to the chutes 27 under the action of gravity, there are mounted on the upper end portions of the chutes relatively slidable agitating plates 29 which extend into the lower ends of the hoppers. Also each chute 27 has associated with it a pair of longitudinally arranged bars 30, 31 which may be of angle section, and which are mounted on opposite sides of the chute so as to be capable of endwise sliding movement relatively to the chute, the upper ends of the bars being situated adjacent to the hopper delivery openings as 32, and having their edges obliquely disposed as shown in the directions of both their length and breadth to assist in guiding the work pieces from the hoppers 26 into the upper ends of the chutes. The slidable bars 30, which are situated at the adjacent sides of the chutes 27, are secured at their upper ends to the agitating plates 29 by bolts 33 or other fastenings. Also the slidable bars 31 are interconnected near their upper ends by a transverse bar 34 which at its centre is secured to a piston rod 35, and is connected through the medium of slotted levers 36 to the slidable bars 30, the levers being pivoted on fixed axes at positions intermediate their ends. The piston rod 35 is connected to a piston 37 which is slidable in a longitudinally immovable cylinder 38 under the action of compressed air, and the arrangement is such that reciprocation of the piston in the cylinder is accompanied by opposite reciprocatory movements of the two bars 30, 31 associated with each chute 27, and also by reciprocation of the agitating plates 29 which are secured to the bars 30. The plates 29 thus serve to agitate the work pieces in the hoppers 26, and thereby permit free movement of the work pieces from the hoppers to the upper ends of the chutes 27, this movement being assisted by the oblique upper ends of the bars 30, 31. The cylinder 38 is provided with pipe connections 39 for the admission and release of compressed air.

The chutes 27 are formed in part or supported by a common inclined plate 40 which at its lower end is supported by a table 41, and on the table are mounted guides 42 along which the work pieces 28 leaving the chutes can be fed horizontally to tapping positions beneath the corresponding taps 8, these positions being determined by adjustable stops 43 on the table. At the ends adjacent to the tapping positions, the guides 42 are formed with vertical extensions as 42ª which serve to hold the work pieces against rotation during the tapping operations.

Arranged in association with each chute 27 is a feed member 44 which is adapted by successively engaging and propelling different work pieces 28 occupying an intermediate position in the chute to impart feeding movements to the preceding work pieces. Each feed member 44 consists of a radial peg adjustably secured on a rod 45, and each chute 27 is formed near its lower end with a centrally arranged longitudinal slot 46 through which the associated feed member can pass into engagement with the hole in the work piece occupying an intermediate position in the chute over the upper end of the slot. Also each feed member 44 is adapted to receive a compound reciprocatory motion consisting of a forward movement through the upper end of the associated slot 46 into engagement with the adjacent work piece, a feeding movement along the slot to propel the said work piece along the chute and thereby impart a feed movement to the preceding work pieces, a retractive movement out of engagement with the propelling work piece, and finally an idle return movement to its initial position. For enabling this motion to be imparted to the feed members 44, the rods carrying the feed members are secured to pistons 47, and the latter are slidable under the action of compressed air in cylinders 48 which are pivotally attached to fixed supporting brackets 49 on the underside of the chute plate 40. Moreover, there is arranged at right angles and adjacent to the two rods 45 carrying the feed members 44, a third rod 50 which extends between the first mentioned rods and the underside of the chute plate 40, and which is connected to a piston 51, the latter being slidable under the action of compressed air in a fixed cylinder 52. The third rod 50 has secured thereon at positions adjacent to the other two rods 45, a pair of collars 53 formed at positions intermediate their ends with shoulders 54 of conical form. Further, the two rods 45 carrying the feed members 44 are loaded at the ends remote from the pistons 47 by any convenient compression or other springs 55, which hold these rods in contact with the collars 53 on the third rod 50. When the third rod 50 is moved axially in the appropriate direction the collars 53 thereon allow the other two rods 45 to be moved laterally by their loading springs 55 for causing movement of the feed members 44 through the slots 46 in the chutes 27 into engagement with the adjacent work pieces 28. The ensuing feeding movements of the feed members 44 are effected by axial movements of the rods 45 carrying the feed members prior to the return movement of the third rod 50. When the feeding movements have been completed the third rod 50 is returned to its initial position, and the shoulders 54 on the collars 53 carried by the third rod cause the other two rods 45 to move laterally against the action of their loading springs 55 for retracting the feed members 44. The rods 45 are then moved axially in the opposite direction for effecting the idle return movements of the feed members 44 to their initial positions in readiness for another cycle of operations.

The cylinders 48 are provided at their ends with pipe connections 56 for the admission and release of the compressed air required to actuate the pistons 47 which serve to impart the above described axial movements to the rods 45. Likewise the cylinder 52 is provided at its ends with pipe connections 57 for the admission and release of the compressed air required to actuate the piston 51 which serves to impart the above described axial movements to the rod 50.

To prevent the work pieces 28 from being lifted by the engagement therewith of the feed members 44, any convenient means are provided for retaining the work pieces within the chutes 27 in the regions of the slots 46. In the example shown such means comprise thin metal strips 58 which extend along the open upper sides of the lower parts of the chutes 27 and the adjacent ends of the guides 42 on the table 41. The strips 58 are carried by plates 59 having secured thereto adjusting screws 60 which engage rotatable but axially immovable nuts 61 on fixed supporting plates 62.

Figure 8:
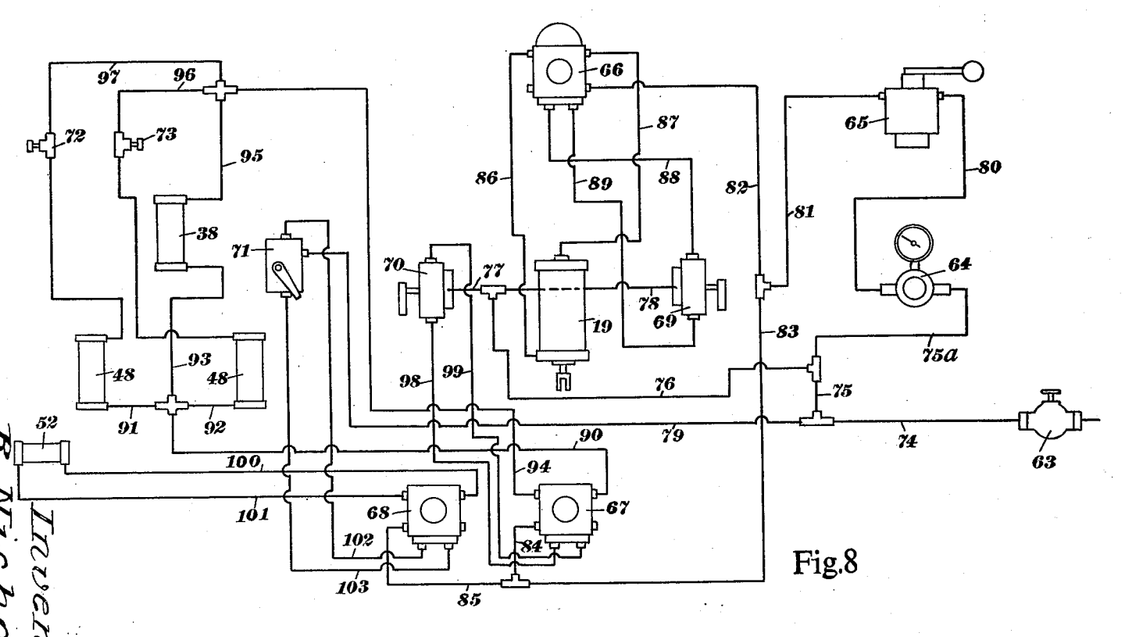
Figure 8 is a diagram illustrating a control system associated with the machine for enabling the various parts thereof to be operated pneumatically.

For automatically controlling the flow of compressed air to and from the cylinders 19, 38, 48 and 52, we employ the system illustrated diagrammatically in Figure 8. This system is adapted to be supplied under the control of a main valve 63 with compressed air from any convenient source, and includes an adjustable pressure-reducing valve 64, a manually-operable starting valve 65, three valves 66, 67 and 68 (hereinafter termed automatic valves) which are operable by air pressure and serve to control the flow of compressed air to and from the cylinders 19, 38, 48 and 52, three valves 69, 70 and 71 (hereinafter termed impulse valves) which are operable by moving parts of the machine and serve to control the flow of compressed air for actuating the automatic valves, and a pair of manually-operable valves 72 and 73 (hereinafter termed isolating valves) for rendering the pistons 47 in the cylinders 48 inoperative if desired. Compressed air admitted to the system through the main valve 63 has access to the pressure-reducing valve 64 through piping 74, 75 and 75ª, and also has access to the three impulse valves 69, 70 and 71 through piping 74, 75, 76, 77, 78 and 79 without passing through the pressure-reducing valve. The purpose of the pressure-reducing valve 64 is to enable the cylinders 19, 38, 48 and 52 to be supplied with compressed air (herein termed low-pressure air) at a variable pressure lower than that of the air (herein termed the high pressure air) employed for actuating the automatic valves 66, 67 and 68. Low-pressure air leaving the pressure-reducing valve 64 has access through piping 80 to the starting valve 65 and, when the latter is open, can flow through piping 81, 82, 83, 84 and 85 to the three automatic valves 66, 67 and 68 which control the flow of such air to and from the cylinders 19, 38, 48 and 52. The automatic valve 66 serves to control the flow of low-pressure air to and from the cylinder 19, and for this purpose is connected to opposite ends of the cylinder by piping 86, 87. Actuation of the automatic valve 66 is effected by high-pressure air supplied thereto through piping 88, 89 under the control of the impulse valve 69. The automatic valve 67 serves to control the flow of low-pressure air to and from the cylinders 38 and 48, and for this purpose is connected to one end of each of these cylinders by piping 90, 91, 92 and 93, and to the other ends by piping 94, 95, 96 and 97. Actuation of the automatic valve 67 is effected by high-pressure air supplied thereto through piping 98 and 99 under the control of the impulse valve 70. The automatic valve 68 serves to control the flow of low-pressure air to and from the cylinder 52, and for this purpose is connected to opposite ends of the cylinder by piping 100, 101. Actuation of the automatic valve 68 is effected by high-pressure air supplied thereto through piping 102, 103 under the control of the impulse valve 71.

The impulse valve 69 is operable by the axial movements of one of the tap spindles 1, (that surrounded by the right hand sleeve 12 in Figure 4) through the medium of a radial arm 104 (Figure 1) on the surrounding sleeve, a vertical stem 105 carrying a pair of adjustable collars 106 through the medium of which the stem is movable axially when the spindle approaches its upper and lower positions, and a lever 107 interconnecting the stem and impulse valve 69, the arrangement being such that when the spindle approaches its upper or lower position the arm on the sleeve serves by contact with the corresponding collar on the stem to impart axial movement to the stem which serves, through the medium of the lever 107, to actuate the impulse valve 69.

The second impulse valve 70 is operable in a similar manner to the impulse valve 69 by the axial movements of the other tap spindle 1.

The third impulse valve 71 is operable by the transverse bar 34 (Figure 7) through which motion is imparted to the agitating plates 29. For this purpose the impulse valve 71 is provided with an actuating lever 108 which is pivoted to one end of an axially movable stem 109 carrying a pair of adjustable collars 110. Also one end of the bar 34 is provided with an extension 111 which is adapted by contact with the collars 110 to impart movement from the bar to the stem 109, and thus to the valve-actuating lever 108.

Figure 12:
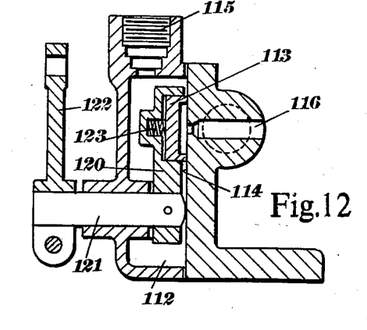
Figures 12 and 13 are sectional views taken at right angles to each other of one of a plurality of similar mechanically operable valves employed in the system illustrated by Figure 8.
Figure 13:
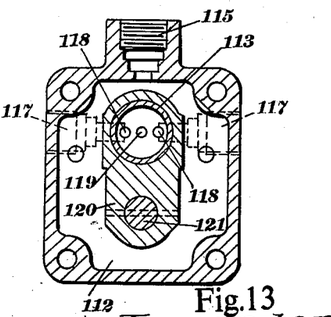

The impulse valves 69, 70 and 71 may have any convenient form, but preferably they have the known form exemplified in Figures 12 and 13. The valve shown in this example comprises a hollow body part 112 containing an oscillatory closure member 113 in slidable contact with a seating 114. The body part 112 is provided with an inlet pipe connection 115 for the admission of compressed air, an air exhaust passage 116, and a pair of additional pipe connections 117 through which compressed air can flow out of and back to the interior of the body part under the control of the closure member 113, the last mentioned pipe connections being in communication respectively with a pair of ports 118 formed in the seating 114 at opposite sides of a third port 119 communicating with the exhaust passage, so that in one extreme position of the closure member one of the said pair of ports communicates with the inlet pipe connection and the other with the air exhaust passage, and in the other extreme position of the closure member the reverse effect is obtained. The closure member 113 is operable by an arm 120 on the inner end of a spindle 121 which passes through the wall of the body part 112 opposite to the seating 114, and which has secured to its outer end a lever 122 adapted to be actuated by the appropriate moving part of the machine, a spring 123 being arranged between the arm and the closure member for holding the latter in tight contact with its seating 114.

Figure 9:
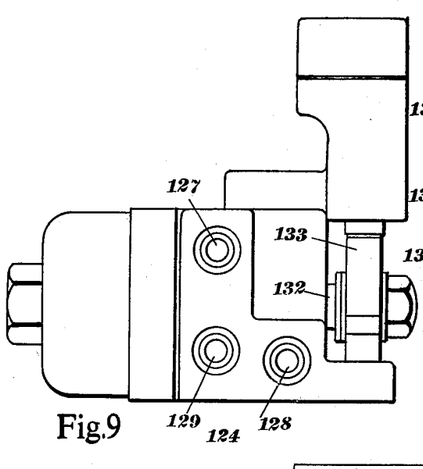
Figure 9 is a side view of one of a plurality of similar pneumatically operable slide valves employed in the system illustrated by Figure 8, and Figures 10 and 11 are respectively a sectional view taken on the line 10—10 of Figure 9, and a part sectional view illustrating the slidable closure member of the valve and its seating.
Figure 10:
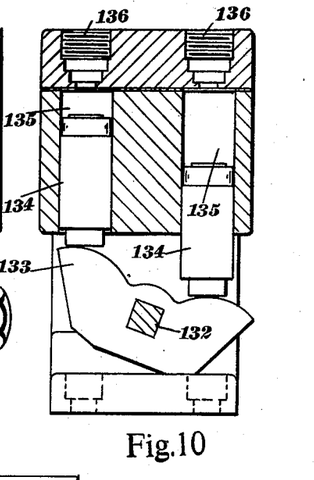
Figure 11:
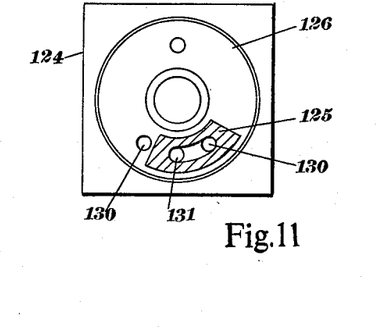

The automatic valves 66, 67 and 68 may also have any convenient form, but preferably they have the known form exemplified in Figures 9 to 11. The valve shown in this example comprises a hollow body part 124 containing an oscillatory closure member 125 in slidable contact with a seating 126. The body part 124 is provided with an inlet pipe connection 127 for the admission of compressed air, an air exhaust passage 128, and a pair of additional pipe connections as 129 through which compressed air can flow out of and back to the interior of the body part under the control of the closure member 125. Only one of the pipe connections 129 is shown in Figure 9, the other being situated at the opposite side of the body part 124. These pipe connections 129 are in communication respectively with a pair of ports 130 formed in the seating 126 at opposite sides of a third port 131 communicating with the exhaust passage, so that in one extreme position of the closure member one of the said pair of ports communicates with the inlet port connection and the other with the air exhaust passage, and in the other extreme position of the closure member the reverse effect is obtained. The closure member 125 is operable by a spindle 132 in a similar manner to the impulse valve shown in Figures 12 and 13, and on the outer end of the spindle is secured a double-armed lever 133 which is operable to impart movement to the closure member 125 by a pair of pistons 134, the latter being slidable in cylinders 135 into and out of which high pressure air for actuating the pistons can flow through pipe connections 136.

The operation of the machine above described is as follows:

It will be first assumed that the main valve 63 is open for admitting high pressure air to the system, the starting valve 65 is in a closed position in which it serves to release low-pressure air from the part of the system supplied through starting valve, and the tap spindles 1 are rotating. In this condition the tap spindles 1 are in their lowermost positions due to the effect of gravity, and the impulse valve 69 is in an extreme position in which the automatic valve 66 is set for admitting low-pressure air to the lower end and exhausting the upper end of the cylinder 19. Also, the impulse valve 70 is in an extreme position in which the automatic valve 67 is set for admitting low-pressure air to the upper ends and exhausting the lower ends of the cylinders 38, 48. Moreover, the impulse valve 71 is in an extreme position in which the automatic valve 68 is set for admitting low-pressure air to one end and exhausting the other end of the cylinder 52 in order to hold the piston in this cylinder in the position in which the feed members 44 can engage the adjacent work pieces in the chutes 27. If the starting valve 65 is now opened the tap spindles 1 will be raised and the feed members 44 will perform their operative strokes. When the tap spindles 1 approach their uppermost positions, the impulse valves 69, 70 will be moved to their opposite extreme positions for enabling high pressure air to move the automatic valves 66, 67 into positions in which low-pressure air is admitted to the upper end and exhausted from the lower end of the cylinder 19, and is admitted to the lower ends and exhausted from the upper ends of the cylinders 38, 48. Also the impulse valve 71 will be moved by the transverse bar 34 associated with the agitating plates 29 to the opposite extreme position for enabling high pressure air to move the automatic valve 68 into a position in which the piston in the cylinder 52 is moved by low-pressure air in the direction for retracting the feed members 44. The tap spindles 1 now descend under the action of gravity for enabling the required tapping operations to be performed on the work pieces occupying the tapping positions. Meanwhile, the feed members 44 perform their idle return movements. When the tap spindles 1 approach their lowermost positions and the feed members approach the end of their return travel, the impulse valves 69, 70 and 71 are returned to their initial positions in readiness for another cycle of operations.

If the downward movement of either of the tap spindles 1 is obstructed the machine will be brought to rest automatically due to the fact that the impulse valve 69 will not be actuated to keep the machine in motion.

In the foregoing we have described an application of the invention to a two-spindle machine adapted to operate on two work pieces simultaneously, but it may be applied in essentially the same manner to other multi-spindle machines, or to single-spindle machines.

By this invention the desired automatic feeding of the work pieces to a tapping position or positions can be effected in a simple and expeditious manner, the duty of the attendant being simply to keep the hoppers loaded with work pieces. Also we are able to render a nut-tapping machine of the kind specified, fully automatic.

The invention is not, however, limited to the constructional details above described as these may be varied to suit requirements. Thus, instead of employing a single piston and cylinder for imparting reciprocatory axial movements to the tap spindles, we may employ a separate piston and cylinder for each tap spindle. Or we may dispense with the pneumatic actuating means above described, and in place thereof employ mechanically operable actuating means.

Having thus described our invention what we claim as new and desire to secure by Letters Patent is:

1. A nut-tapping machine of the type specified, comprising in combination a supply hopper for work pieces to be tapped, an inclined chute having its upper end in communication with said hopper so that work pieces from the latter can enter and travel down said chute under the action of gravity, a vertically arranged rotary and axially movable tap spindle, a horizontal guide which extends from the lower end of said chute and along which work pieces are movable from the lower end of said chute to a tapping position beneath said tap spindle, a feed member movable into, along, and out of, an intermediate part of said chute for successively propelling different work pieces in said chute and thereby imparting feed movements to the preceding work pieces, a rod arranged beneath said chute and provided with a lateral projection forming said feed member, said chute being slotted to allow said feed member to pass therethrough, a relatively slidable piston and cylinder operatively associated with said rod for imparting thereto axial movements with respect to said feed chute under the action of compressed air, a spring acting on said rod and tending to impart thereto lateral movement with respect to said feed chute, a second rod arranged at right angles and adjacent to the first mentioned rod, a collar provided on said second rod to impart lateral movement to the first mentioned rod against the action of said spring in response to axial movement of said second rod in one direction, and a relatively slidable piston and cylinder operatively associated with said second rod for imparting axial movements thereto under the action of compressed air.

2. A nut-tapping machine of the type specified, comprising in combination a supply hopper for work pieces to be tapped, an inclined chute having its upper end in communication with said hopper so that work pieces from the latter can enter and travel down said chute under the action of gravity, a vertically arranged and axially movable tap spindle, a horizontal guide which extends from the lower end of said chute and along which work pieces are movable from the lower end of said chute to a tapping position beneath said tap spindle, a feed member movable into, along, and out of, an intermediate part of said chute for successively propelling different work pieces in said chute and thereby imparting feed movements to the preceding work pieces, actuating means operatively associated with said feed member for imparting compound reciprocatory motion thereto, an agitating plate extending into the lower end of said hopper, a pair of relatively slidable bars situated longitudinally at opposite sides of said chute with their upper ends adjacent to the lower end of said hopper, said plate being secured to one of said bars, a transverse member secured to the other of said bars and movable longitudinally of said chute, and a lever interconnecting said transverse member and the bar to which said plate is secured, so that movement of said transverse member is accompanied by opposite sliding movements of said bars.

3. A nut-tapping machine of the type specified, comprising in combination a supply hopper for work pieces to be tapped, an inclined chute having its upper end in communication with said hopper so that work pieces from the latter can enter and travel down said chute under the action of gravity, a vertically arranged and axially movable tap spindle, a horizontal guide which extends from the lower end of said chute and along which work pieces are movable from the lower end of said chute to a tapping position beneath said tap spindle, a feed member movable into, along, and out of, an intermediate part of said chute for successively propelling different work pieces in said chute and thereby imparting feed movements to the preceding work pieces, actuating means operatively associated with said feed member for imparting a compound reciprocatory motion thereto, an agitating plate extending into the lower end of said hopper, a pair of relatively slidable bars situated longitudinally at opposite sides of said chute with their upper ends adjacent to the lower end of said hopper, said plate being secured to one of said bars, a transverse member secured to the other of said bars and movable longitudinally of said chute, a relatively slidable piston and cylinder operatively connected to said transverse member for imparting movement thereto under the action of compressed air, and a lever interconnecting said transverse member and the bar to which said plate is secured, so that movement of said transverse member is accompanied by opposite sliding movements of said bars.

4. A nut-tapping machine of the type specified, comprising in combination a supply hopper for work pieces to be tapped, an inclined chute having its upper end in communication with said hopper so that work pieces from the latter can enter and travel down said chute under the action of gravity, a vertically arranged and axially movable tap spindle, a horizontal guide which extends from the lower end of said chute and along which work pieces are movable from the lower end of said chute to a tapping position beneath said tap spindle, a feed member movable into, along, and out of, an intermediate part of said chute for successively propelling different work pieces in said chute and thereby imparting feed movements to the preceding work pieces, pneumatically operable actuating means operatively associated with said feed member for imparting compound reciprocatory motion thereto, and a pneumatic control system comprising a pressure-reducing valve, compressed air supply piping connected to the inlet side of said pressure-reducing valve, a manually operable valve having its inlet side connected to the delivery side of said pressure-reducing valve, a plurality of control valves having their inlet sides connected to the delivery side of said manually operable valve and their delivery sides connected to said pneumatically operable actuating means so that said control valves serve to control the flow of compressed air from said manually operable valve to said pneumatically operable actuating means, said control valves having operating means responsive to air pressure, and a plurality of additional valves having actuating members arranged to be operated by moving parts of the machine, said additional valves having their inlet sides connected to said compressed air supply piping and their delivery sides connected to the operating means of said control valves, so that said additional valves serve to control communication between said piping and operating means.

REX NICHOLS.
WILLIAM BROWN.

REFERENCES CITED

The following references are of record in the file of this patent:

UNITED STATES PATENTS

| Number | Name | Date |
|---|---|---|
| 458,557 | Bennett | Sept. 1, 1891 |
| 500,319 | Crisp | June 27, 1893 |
| 828,682 | Rodd | Aug. 14, 1906 |
| 1,043,286 | Adriance | Nov. 5, 1912 |
| 1,645,418 | Cramer | Oct. 11, 1927 |
| 1,839,920 | Henry | Jan. 5, 1932 |
| 1,859,026 | Crosby | May 17, 1932 |
| 2,336,676 | Erickson | Dec. 14, 1943 |